US012752362B2

(12) United States Patent
Yildirim

(10) Patent No.: US 12,752,362 B2
(45) Date of Patent: Oct. 6, 2026

(54) LIFE-EXTENDED ELECTRODE USED IN LIQUID-COOLED PLASMA ARC CUTTING TORCHES

(71) Applicant: Ahmet Yildirim, Bornova (TR)

(72) Inventor: Ahmet Yildirim, Bornova (TR)

(*) Notice: Subject to any disclaimer, the term of this patent is extended or adjusted under 35 U.S.C. 154(b) by 541 days.

(21) Appl. No.: 18/554,012

(22) PCT Filed: Apr. 5, 2022

(86) PCT No.: PCT/TR2022/050301
§ 371 (c)(1),
(2) Date: Oct. 5, 2023

(87) PCT Pub. No.: WO2022/216261
PCT Pub. Date: Oct. 13, 2022

(65) Prior Publication Data

US 2024/0109146 A1 Apr. 4, 2024

(30) Foreign Application Priority Data

Apr. 6, 2021 (TR) ............................... 2021/006109

(51) Int. Cl.
*B23K 9/28* (2006.01)

(52) U.S. Cl.
CPC .................................... *B23K 9/285* (2013.01)

(58) Field of Classification Search
None
See application file for complete search history.

(56) References Cited

U.S. PATENT DOCUMENTS 6,841,754 B2 * 1/2005 Cook ................. B23K 35/0216
8,710,397 B2 * 4/2014 Jehnert ..................... H05H 1/34 219/121.52
9,024,228 B2 * 5/2015 Yamaguchi .............. H05H 1/34 219/121.49
9,730,307 B2 * 8/2017 Namburu ................. H05H 1/28
9,743,504 B2 * 8/2017 Laurisch .................. H05H 1/34
10,639,748 B2 * 5/2020 Namburu ............... B23K 35/40
10,898,913 B2 * 1/2021 Molz ......................... B05B 7/22
11,310,901 B2 * 4/2022 Namburu ........... B23K 35/0205
11,997,779 B2 * 5/2024 Namburu ................. H05H 1/34
2006/0289407 A1 * 12/2006 Cook ........................ H05H 1/34 219/121.52
2008/0093346 A1 4/2008 Yamaguchi et al.
2012/0138584 A1 * 6/2012 Ashtekar ................ B23K 35/00 219/121.52
2015/0083695 A1 3/2015 Laurisch et al.
(Continued)

OTHER PUBLICATIONS

International Search Report for corresponding PCT/TR2022/050301 dated Aug. 16, 2022.
(Continued)

*Primary Examiner* — Thor S Campbell
(74) *Attorney, Agent, or Firm* — Egbert, McDaniel & Swartz, PLLC

(57) ABSTRACT

Disclosed is a life-extended electrode used in liquid-cooled plasma arc cutting torches with cooling surface increase by scraping from top to bottom on the inner surfaces washed by coolant, by pressing on the bottom, by creating indentations and protrusions that extend in parallel and/or at the same angle as well as instant heat transfer speed increase by the approach of the heat transfer wall.

7 Claims, 5 Drawing Sheets

(56) References Cited

U.S. PATENT DOCUMENTS

Figure 1:
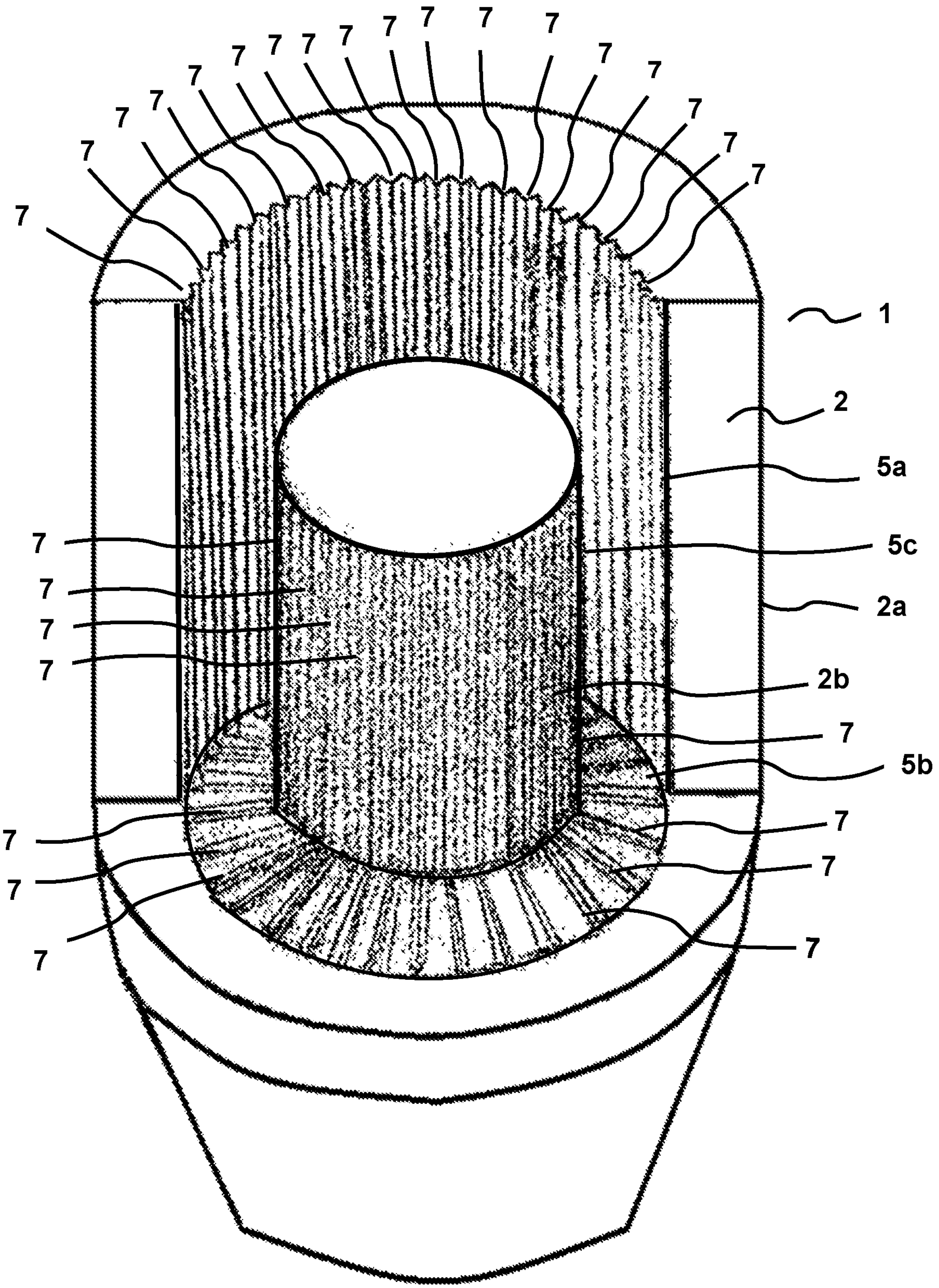

| | | | | |
|---|---|---|---|---|
| 2017/0188446 | A1* | 6/2017 | Namburu ................. | H05H 1/28 |
| 2020/0214118 | A1* | 7/2020 | Krink ................... | H05H 1/3442 |
| 2024/0196509 | A1* | 6/2024 | Yildirim .................. | H05H 1/28 |

OTHER PUBLICATIONS

Written Opinion of the International Searching Authority for corresponding PCT/TR2022/050301 dated Aug. 16, 2022.

* cited by examiner

LIFE-EXTENDED ELECTRODE USED IN LIQUID-COOLED PLASMA ARC CUTTING TORCHES

TECHNICAL FIELD

The invention relates to liquid-cooled plasma cutting torches which allow a surface increase in the inner surfaces of the electrode with the innovations made on the liquid cooling system electrode for plasma cutting torches, and thusly allows an extended life and increase efficiency.

DESCRIPTION OF THE INVENTION

The electrodes known in the market are, for automated or manual liquid cooling system plasma cutting torches, based on a similar architecture, including an electrode made of copper or silver and/or copper/silver and copper/silver alloy, an emitter insert inside an arc plasma cutting torches equipped with such an electrode, a gas diffuser, and a body to which a nozzle for narrowing the plasma jet is secured.

In general, the electrodes used in these plasma torches consist of a copper and/or silver and/or copper/silver and/or copper/silver alloy to which an electron emitter cutter tip or emitter cutter tip is secured. The cutter tip is tungsten or hafnium or zirconium. This insert (emitter cutter tip), typically cylindrical in shape, is secured by stamping, crimping into a cavity such as a blind hole (the cavity where the emitter cutter tip is secured) arranged at the downstream tip of the electrode body.

It is well known that during the plasma cutting process, an emitter insert (emitter cutter tip) is exposed to particularly very high temperatures and suction forces produced more or less by the arc plasma jet, which begins to take root in that insert (emitter cutter tip). It is inevitable that a crater is formed inside said insert (emitter cutter tip) because the metal or metal alloy forming the insert (emitter cutter tip) significantly evaporates, it has a portion that cannot become solid at a sufficient speed during phase transitions, thusly is thrown into the plasma jet.

With this abrasion, this more or less rapid deterioration of the tips of the electrodes of plasma torches is almost inevitable and presents a real problem on an industrial scale. Because it requires frequent replacement of the torch electrodes, also affects the efficiency of the cutting process, so the replacement of the electrode stops the system, stops the cutting process, and incurs additional costs. Therefore, when an emitter insert fails, it is not possible to replace only the insert, and it is the entire electrode that must be replaced.

The invention has been made in order to minimize the aforementioned disadvantages and to find a solution to this problem.

For this purpose, coolant channels are formed with indentations/protrusions opened by scraping from top to bottom at equal intervals parallel to each other in the direction of the coolant flow from the upper surface of the upstream cylindrical tip at the level of the one-eyed blind hole to the side surface of the cylinder, which goes down to the level of the bottom surface of the internal one-eyed blind hole, and coolant channels are formed with indentations/protrusions opened by pressing (squeezing) method at equal intervals and angle extension on the base surface of an internal one-eyed blind hole so that the indentations/protrusions of these channels will correspond. Coolant channels are formed in the form of indentations and protrusions by scraping from top to bottom to the internal one-eyed blind hole outer surface at equal intervals to the internal one-eyed blind hole base surface. Thanks to the surface increases obtained by the water channels opened on these three surfaces, the cooling of the nearest contacting surfaces of the body, where the emitter cutter tip exposed to high heat and needs to be cooled is secured from the most extreme point where the cutting process begins, is enhanced; and thanks to the heat transfer wall approach, the life of the electrode is prolonged for the liquid-cooled plasma cutting torch.

DRAWINGS FOR UNDERSTANDING OF THE INVENTION

FIG. 1 A sectional perspective view of the life-extended electrode used in liquid-cooled plasma arc cutting torches with the cooling surface increase by scraping from top to bottom on the inner surfaces washed by coolant, by pressing on the bottom, and by creating indentations and protrusions that extend in parallel and/or at the same angle extension.

Figure 2A:
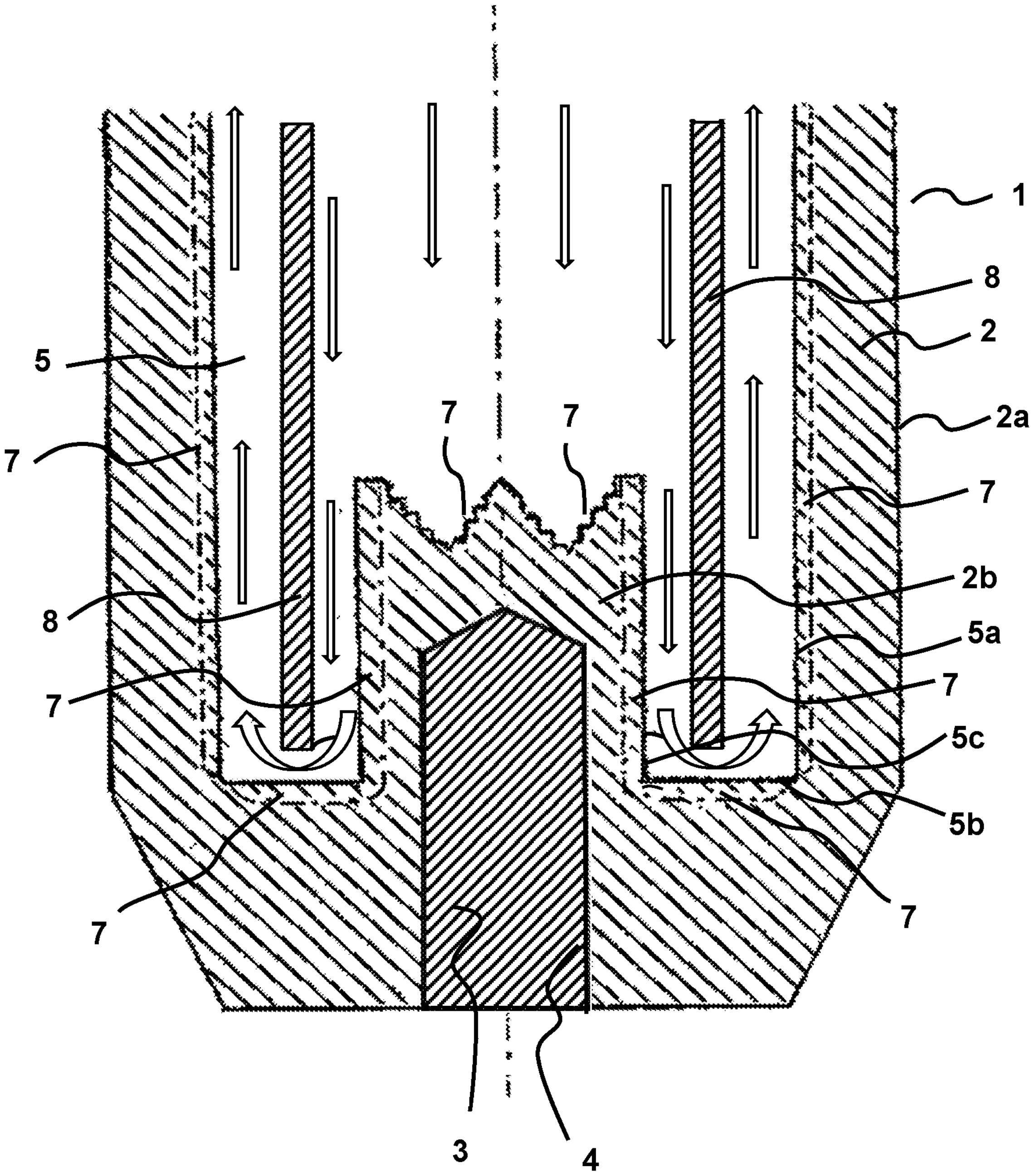

FIG. 2*a* A section of a downstream tip electrode carrying a liquid cooling channel emitter cutter tip for plasma cutting torches with a flat internal one-eyed blind hole bottom surface.

Figure 2B:
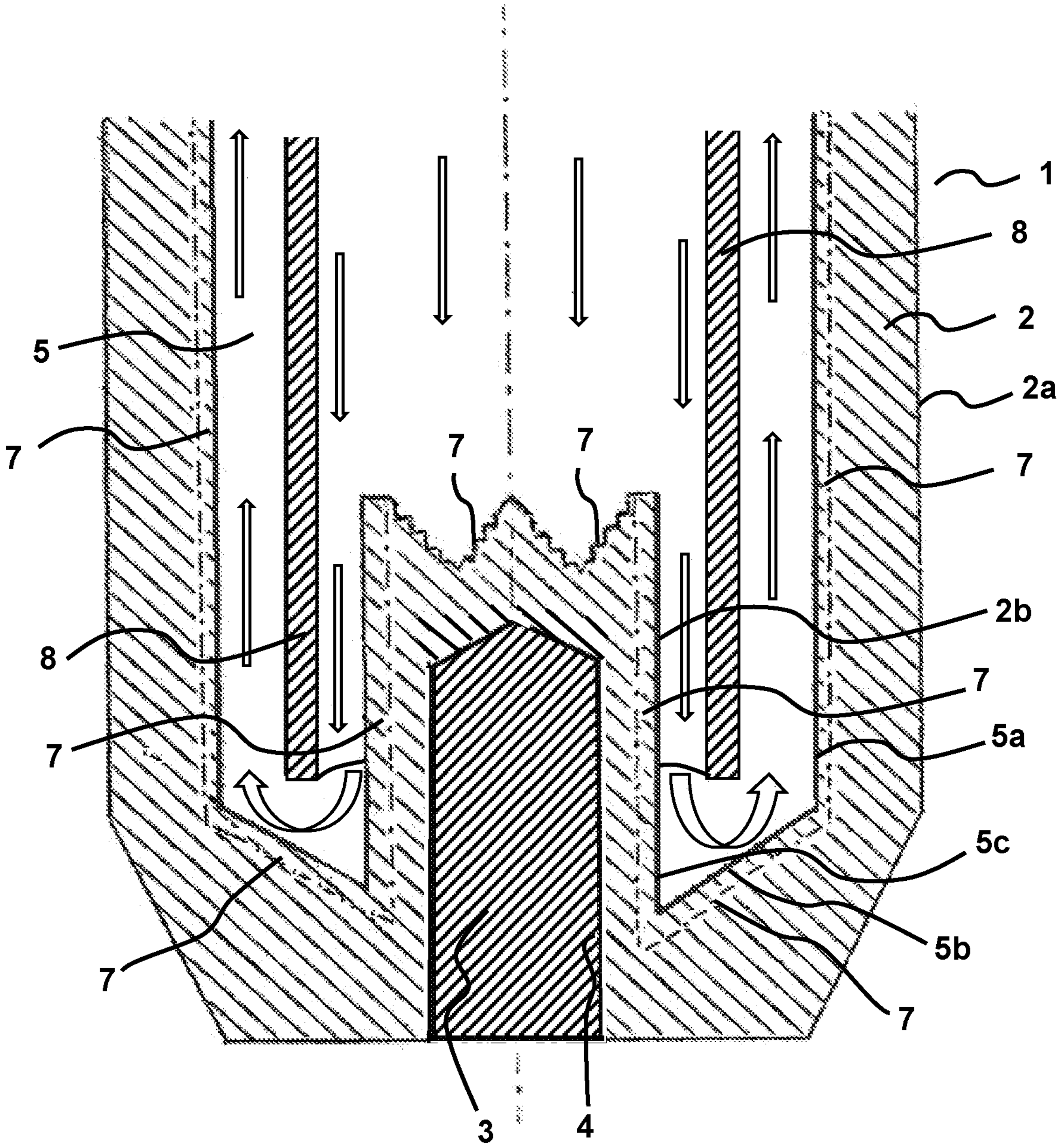

FIG. 2*b* A section of a downstream tip electrode carrying a liquid channel emitter cutter tip for plasma cutting torches with angled internal one-eyed blind hole bottom surface.

Figure 3:
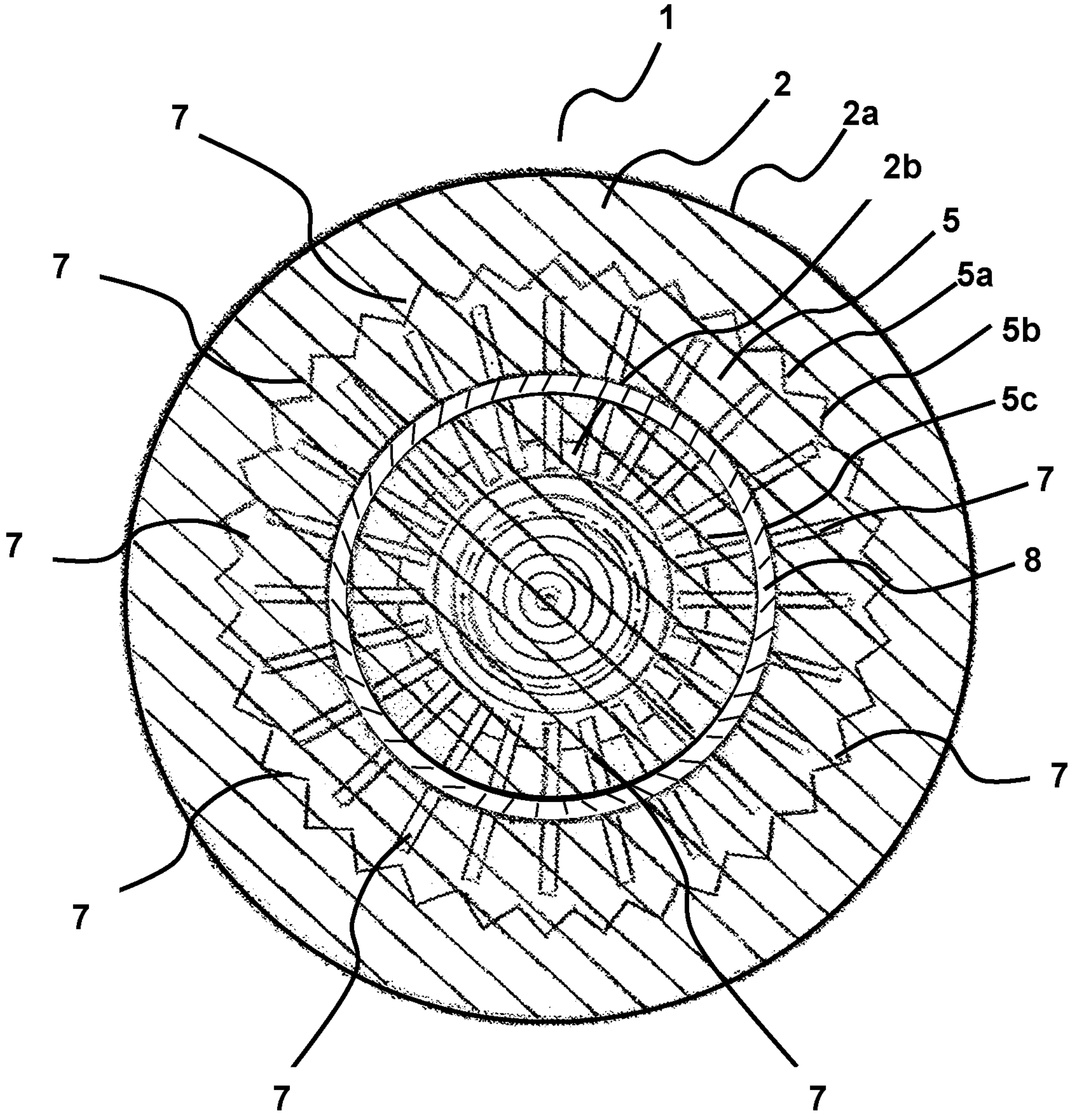

FIG. 3 A section of a downstream electrode carrying a flat-channeled emitter cutter tip.

Figure 4:
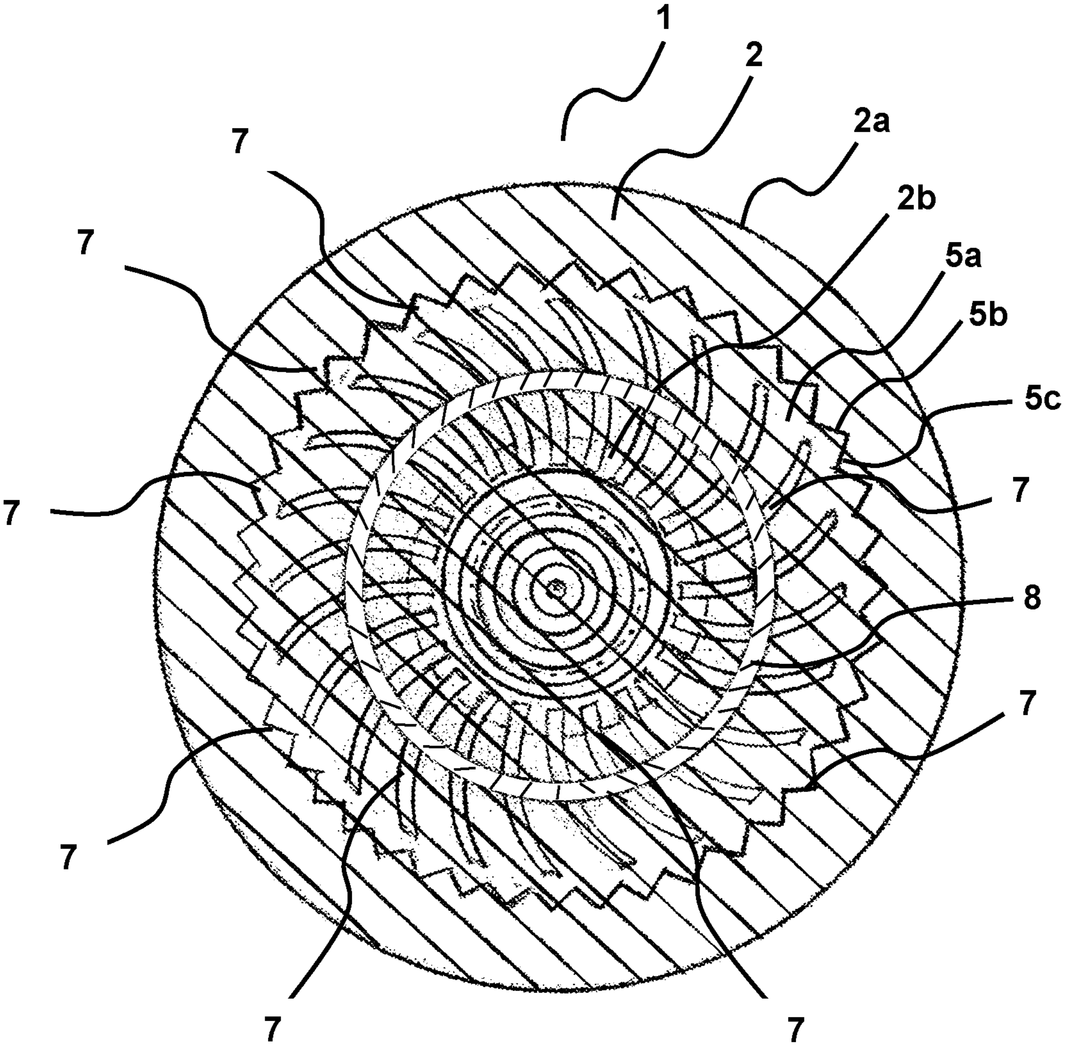

FIG. 4 A section of a downstream electrode carrying a spring-channeled emitter cutter tip.

REFERENCE NUMERALS FOR UNDERSTANDING THE INVENTION

1. Electrode with the liquid cooling system in the plasma arc torch to cut the metallic piece,
2. Body constituting the plasma electrode,
2*a*. A downstream tip carrying the emitter cutter tip,
2*b*. An upstream cylindrical tip at the level of the internal one-eyed blind hole,
3. Emitter cutter tip,
4. Cavity in which the emitter cutter tip is secured,
5. Internal one-eyed blind hole,
5*a*. Cylindrical outer surface of the internal one-eyed blind hole,
5*b*. Base surface of the internal one-eyed blind hole,
5*c*. Outer diameter surface of the upstream cylindrical tip at the level of the internal one-eyed blind hole,
6. Male and female thread pass that connects the electrode to the plasma torch,
7. Coolant channels,
8. Coolant submersible pipe.

DETAILED DESCRIPTION OF THE INVENTION

The invention is the life-extended electrode used in liquid-cooled plasma arc cutting torches with cooling surface increase by scraping from top to bottom on the inner surfaces washed by coolant, by pressing on the bottom, and by creating indentations and protrusions that extend in parallel and/or at the same angle extension and with instant heat transfer speed with the approach of the heat transfer wall, it has cooling channels (7) obtained with surface increase in the forms of indentations/protrusions opened at equal intervals and the same angle extension on the inner surface of a downstream tip (2*a*) carrying the emitter cutter tip, i.e. on the cylindrical outer surface (5*a*) of an internal one-eyed blind hole; on the outer surface of the upstream cylindrical tip (2*b*) at the level of the internal one-eyed blind hole, i.e., on the outer diameter surface of the upstream cylindrical tip (5*c*) at the level of the internal one-eyed blind hole; and on the base surface of the internal one-eyed blind hole base surface (5*b*), in parallel with the coolant flow direction, by scraping from top to bottom in parallel, with the same number and the same angles on the side surfaces, and opened by pressing (squeezing) on the bottom portion at equal intervals and with the same angle extension on the entire surface on the body (2) forming the plasma electrode of the electrode with the liquid cooling system in the plasma torch to cut the metallic piece (FIG. 1, FIG. 2*a*, FIG. 2*b*).

As can be seen in FIGS. 2*a* and 2*b*, the coolant channels (7) are obtained by forming indentations and protrusions next to each other at equal dimensions and equal angles in parallel with the coolant flow direction and each other by pressing (squeezing) on the base surface (5*b*) of the internal one-eyed blind hole in the electrode with liquid cooling system (FIG. 1).

As can be seen in FIGS. 2*a* and 2*b*, the coolant channels (7) are obtained by forming indentations and protrusions next to each other at equal dimensions and equal angles in parallel with the coolant flow direction and each other by scraping from top to bottom on the outer diameter surface (5*c*) of the upstream cylindrical tip at the level of the internal one-eyed blind hole, extending down to the level of the base surface (5*b*) of the internal one-eyed blind hole (FIG. 1).

As can be seen in FIGS. 2*a* and 2*b*, the coolant channels (7) are obtained by forming indentations and protrusions next to each other at equal dimensions and equal angles in parallel with the coolant flow direction and each other by scraping from top to bottom on the cylindrical outer surface of the internal one-eyed blind hole (FIG. 1).

Thanks to the surface increases obtained by the coolant channels (7) opened on these three surfaces (5*a*, 5*b*, 5*c*), the cooling of the closest contacting surfaces (5*a*, 5*b*, 5*c*) with the cavity (4) to which the emitter cutter tip (3) exposed to high heat and required to be cooled with the coolant coming from the coolant submersible pipe (8) inside the internal one-eyed blind hole (5) is further increased with the surface increases, thusly the life of the electrode for the liquid-cooled plasma arc cutting torch is extended, and more efficient use thereof is ensured (FIG. 1, FIG. 2*a*, FIG. 2*b*).

The flow direction of the coolant coming from the coolant submersible pipe (8) extending downwards from the middle of the internal one-eyed blind hole (5) in the body (2) of the electrode forming the plasma electrode, within the body (2) forming the plasma electrode is shown with arrows as seen in FIG. 2*a* and FIG. 2*b* and it enables the cooling of the emitter cutter tip (3) (tungsten, hafnium, zirconium, etc.) that is exposed to the suction forces produced by the arc plasma jet during the operation of the electrode and that performs the metal cutting process.

The coolant channels (7) formed with indentations and protrusions by scraping or pressing with equal intervals, in parallel, or with equal angles to each other on said surfaces (5*a*, 5*b*, 5*c*) may be made of indentations and protrusions of all kinds of geometric sections and all kinds of geometric extensions that can ensure the highest surface increase. The section of the downstream electrode carrying the emitter cutter tip (3), which is designed as a straight channel, is given in FIG. 3. In addition, as an example, the section of the downstream electrode carrying the emitter cutter tip (3), which is designed as a spring channel, is given in FIG. 4.

For the plasma cutting torches seen in FIG. 2*a*, the internal one-eyed blind hole base surface (5*b*) of the downstream tip electrode carrying the emitter cutter tip with a liquid cooling system for the plasma cutting torches may be flat as seen in FIG. 2*a*, and angled as seen in FIG. 2*b*, or can contain all kinds of geometrical sections and shapes to obtain the highest surface increase.

The diameter of the upstream cylindrical tip at the level of the one-eyed blind hole can be adjusted in proportion to the depth of the channel to be opened, according to the diameter of the emitter cutter tip (3) calculated according to the cutting amperage.

It is possible to carry out operations for appropriate quality steel pins to be prepared for enabling surface increases, for operations such as in-hole, hole-bottom, and outer-cylinder, by means of profile chip removal by scraping and cutting, cleaning and removing the sawdust scraped and cut in appropriate depth dives; shaping by squeezing, chip removal with tools in the form of profile knives.

Said knives can be obtained with CNC-controlled, multi-axis machining benches with high axis positioning and repetition accuracy and capable of multi-operation, wire cutting erosion bench that can cut with 0.02-0.03 wire, CNC sinking erosion, CNC turret lathe, CNC precision grinding varieties. It is possible to minimize the surface roughness of these knives with surface polishing systems. Said knives can perform thousands of operations without deterioration, as they are of copper-silver and/or copper-silver and/or alloys as metals to perform the operation.

The electrode life ended in 2905 blasts in 25-mm thick, A1-quality soft iron sheet cutting made with a 260-ampere electrode formed by these coolant channels (7) with increased surface area, to which is provided an extended life of around 60%, thanks to the coolant channels (7) opened on the outer surface of the upstream cylindrical tip (2*b*) at the level of the internal one-eyed blind hole with the increased cooling surface, and around 40%, thanks to the coolant channels (7) opened on the internal one-eyed blind hole base surface (5*b*). In the cut made with the same system catalog cutting parameters of the same amperage, thickness and same shapes, an increase of about 2 times has been achieved compared to the electrode with a non-increased cooling surface. The cylindrical outer surface (5*a*) increase of the internal one-eyed blind hole not included in the test can be formed with indentations and protrusions to be made with suitable geometric shapes, with the increase in the surface area on said three surfaces (5*a*, 5*b*, 5*c*) being around two times. This results in one electrode doing the work of two or more electrodes. The interruption of the cutting system in electrode replacement, the disadvantages of electrode production costs, time, energy loss, excessive raw material consumption, and many negativities based on these are reduced.

In addition, if desired, a two-fold increase in the surface can be achieved with the indentations and protrusions formed on the upper surface of the upstream cylindrical tip (2*b*) at the level of the internal one-eyed blind hole.

The invention claimed is:

1. A life-extended electrode used in liquid-cooled plasma arc cutting torches with cooling surface increase by scraping from top to bottom on the inner surfaces washed by coolant, by pressing on the bottom, and by creating indentations and protrusions that extend in parallel and/or at the same angle, the electrode comprising cooling channels obtained with surface increase in the forms of indentations/protrusions opened at equal intervals and the same angle extension on the inner surface of a downstream tip carrying the emitter cutter tip, i.e. on the cylindrical outer surface of an internal one-eyed blind hole; on the outer surface of the upstream cylindrical tip at the level of the internal one-eyed blind hole, i.e., on the outer diameter surface of the upstream cylindrical tip at the level of the internal one-eyed blind hole; and on the base surface of the internal one-eyed blind hole base surface, in parallel with the coolant flow direction, by scraping from top to bottom in parallel, with the same number and the same angles on the side surfaces, and opened by pressing on the bottom portion at equal intervals and with the same angle extension on the entire surface on the body forming the plasma electrode of the electrode with the liquid cooling system in the plasma torch to cut the metallic piece.

2. The life-extended electrode used in liquid-cooled plasma arc cutting torches with the cooling surface increase by scraping from top to bottom on the inner surfaces washed by coolant, by pressing on the bottom, and by creating indentations and protrusions that extend in parallel and/or at the same angle according to claim 1, wherein the coolant channels are obtained with surface increase formed with indentations and protrusions next to each other at equal intervals and equal angles in parallel with the coolant flow direction and with each other by scraping from top to bottom on the cylindrical outer surface of the internal one-eyed blind hole.

3. The life-extended electrode used in liquid-cooled plasma arc cutting torches with the cooling surface increase by scraping from top to bottom on the inner surfaces washed by coolant, by pressing on the bottom, and by creating indentations and protrusions that extend in parallel and/or at the same angle according to claim 1, characterized in that it has wherein the coolant channels are obtained with the surface increase in the form of indentations and protrusions next to each other at equal intervals to the coolant flow direction and to each other with the same angle extension by pressing on the base surface of the internal one-eyed blind hole in the electrode with a liquid cooling system.

4. The life-extended electrode used in liquid-cooled plasma arc cutting torches with the cooling surface increase by scraping from top to bottom on the inner surfaces washed by coolant, by pressing on the bottom, and by creating indentations and protrusions that extend in parallel and/or at the same angle according to claim 1, wherein the coolant channels are obtained with the surface increase in the form of indentations and protrusions next to each other at equal intervals, equal dimension, and equal angles in parallel with the coolant flow direction and with each other by scraping from top to bottom on the outer diameter surface of the upstream cylindrical tip at the level of the internal one-eyed blind hole, extending down to the level of the base surface of the internal one-eyed blind hole.

5. The life-extended electrode used in liquid-cooled plasma arc cutting torches with the cooling surface increase by scraping from top to bottom on the inner surfaces washed by coolant, by pressing on the bottom, and by creating indentations and protrusions that extend in parallel and/or at the same angle according to claim 1, wherein the electrode has an extended life and service life, due to more cooling of the emitter cutter tip, by opening coolant channels with the indentations/protrusions opened at equal intervals on the closest contacting surfaces with the cavity to which this emitter cutter tip is secured for more cooling of the emitter cutter tip exposed to high heat during its use and by enabling the passing of the coolant coming from the liquid submersible pipe from more surfaces.

6. The life-extended electrode used in liquid-cooled plasma arc cutting torches with the cooling surface increase by scraping from top to bottom on the inner surfaces washed by coolant, by pressing on the bottom, and by creating indentations and protrusions that extend in parallel and/or at the same angle according to claim 1, wherein the coolant channels are obtained with surface increase formed with indentations and protrusions in parallel at equal intervals to each other and at equal angles in all kinds of geometric section and all kinds of geometric extensions that enable the highest surface increase on said surfaces.

7. The life-extended electrode used in liquid-cooled plasma arc cutting torches with the cooling surface increase by scraping from top to bottom on the inner surfaces washed by coolant, by pressing on the bottom, and by creating indentations and protrusions that extend in parallel and/or at the same angle according to claim 1, wherein the base surface in which the base surface of the internal one-eyed blind hole of the downstream tip electrode carrying the emitter cutter tip with the coolant system for the plasma cutting torches may be flat, angled or all kinds of geometrical sections and shapes that allows the highest surface increase.

* * * * *